United States Patent [19]

Shields

[11] 3,941,933

[45] Mar. 2, 1976

[54] PAGING INTERCOMMUNICATION SYSTEM

[75] Inventor: Roger W. Shields, Ebensburg, Pa.

[73] Assignee: Jab Company, Inc., Ebensburg, Pa.

[22] Filed: Aug. 20, 1974

[21] Appl. No.: 499,022

[52] U.S. Cl. ............................................. 179/1 H
[51] Int. Cl.² ...................................... H04M 13/00
[58] Field of Search .................. 179/1 H, 1 HF, 1 P

[56] References Cited
UNITED STATES PATENTS

| | | | |
|---|---|---|---|
| 2,087,027 | 7/1937 | Glaser | 179/1 H |
| 3,041,411 | 6/1962 | Beatty | 179/1 HF |
| 3,783,195 | 1/1974 | Day | 179/1 H |

Primary Examiner—Kathleen H. Claffy
Assistant Examiner—E. S. Kemeny
Attorney, Agent, or Firm—Clarence A. O'Brien; Harvey B. Jacobson

[57] ABSTRACT

Intercommunication between a plurality of stations is established through a pair of signal lines to which portable units are connected, each unit having its own power supply contributing to a low DC operating voltage maintained across the signal lines through which the audio signals are also conducted. Communicate and pager switches associated with each unit respectively control signal connections, d.c. line-voltage level, and signal input impedance for establishing intercommunication and paging functions.

15 Claims, 3 Drawing Figures

3,941,933

PAGING INTERCOMMUNICATION SYSTEM

This invention relates to intercommunication systems in general and more particularly to a relatively inexpensive and easily installed communication system that is reliable in use and is especially safe for installation in underground mines.

Portable intercommunication systems utilizing a pair of signal lines through which a plurality of units are interconnected, are well known. Generally such systems will have a common power supply by means of which intercommunication is assured. Also, such systems include units composed of special components suitable for only one particular function. Repair and maintenance on such systems is therefore relatively costly and/or difficult. Also, many of such prior intercommunication systems employ relatively unsafe, high voltages providing a safety hazard in environments that often contain combustible gases that are readily ignited. It is therefore an important object of the present invention to provide an intercommunication system which will overcome or eliminate the aforementioned disadvantages and problems associated with prior intercommunication systems.

Applicant is aware of the following U.S. patents disclosing intercommunication systems and other apparatus pertinent to the present invention: U.S. Pat. Nos. 2,257,578; 2,269,572; 2,783,308; 3,175,045; 3,508,139,; 3,573,780; 3,665,116; 3,783,195; 3,792,205.

In accordance with the present invention, a plurality of communication units are connected to a pair of common signal lines through which audio signals are conducted. Operating voltage is applied across the signal lines by the power supplies respectively associated with each of the communication units. Thus, a relatively low DC operating voltage such as 24 VDC, is maintained across the signal lines by a pair of parallel connected batteries associated with each of the communication units. Each unit includes a pair of amplifiers which are interchangeable, one of the amplifiers being coupled to an input microphone while the other of the amplifiers is coupled to an output paging speaker so as to form a paging circuit. Audio signals conducted through the signal lines are fed to the paging circuit in response to energization of a relay which senses relatively high DC current from series-connection of caller's batteries to close a relay switch connecting the paging circuit to the signal lines. This relay is disabled upon selective actuation of a communicate switch which simultaneously connects the signal lines to the other amplifier to which the input microphone is coupled. The input microphone may be associated with a handset which also mounts a small speaker for two-way conversations through the communication circuit to which the microphone is coupled. When both the communicate switch and the pager switch are actuated, the communication unit is conditioned for its paging function by reconnecting the pair of DC batteries normally connected in parallel. When reconnected by the pager switch, one of the batteries is connected between ground and one of the signal lines in series with an impedance network to increase the input signal impedance to audio signals thereby conditioning the communication circuit for signal output only. The amplifiers associated with the communication and paging circuits are interchangeable thereby simplifying repair and maintenance. Also, the switching arrangement aforementioned is such as to simplify the circuit arrangement and to enable the use of a low operating voltage with current limiting facilities to prevent ignition of combustible gases.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
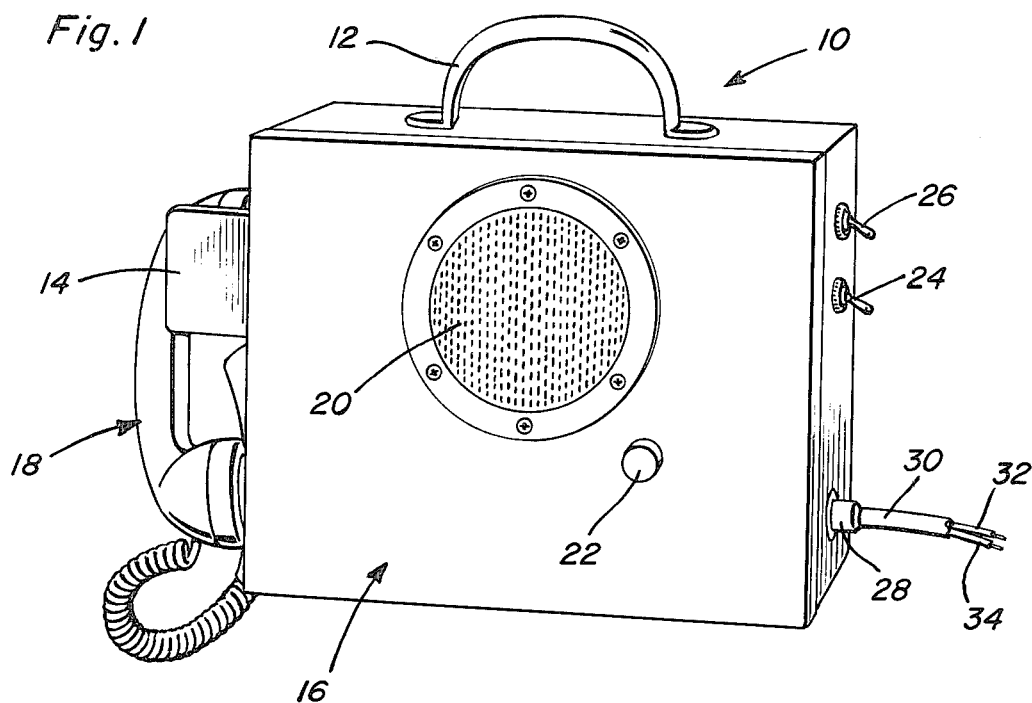
FIG. 1 is a front elevational view of a typical portable communication unit constructed in accordance with the present invention.

Referring now to the drawings in detail, FIG. 1 illustrates a typical portable communication unit generally referred to by reference numeral 10. The unit 10 may be in the form of a portable case adapted to be carried by a handle 12 and opened for exposure of the circuitry therein. A hanger 14 is mounted on one end of the case 16 for supporting a handset 18 in one embodiment of the invention as illustrated. A paging speaker 20 is shown exposed on one front panel of the case 16 adjacent to a receptacle for fuse 22. On the end of the case 16 opposite the handset hanger 14, are a pair of control switches consisting of a communication switch 24 and a pager switch 26. Also mounted on the same end of the case is a fitting 28 through which a signal cable 30 extends into the unit. This signal cable 30 is common to all of the communication units associated with the system and includes a pair of signal conductors 32 and 34.

The unit 10 when connected into the system, will normally be in a standby condition for receiving a paging message from one of the other units in the form of an audio signal combined with a DC driving voltage. Thus, the paging message or audio signal will be reproduced through the output speaker 20 of the unit 10 in order to page a person at each of the stations at which the communication units are located. In order to conduct two way conversations with the person at the station from which the paging message originates, an operator merely actuates the communication switch 24 and removes the handset 18 from its hanger 14. An input transducer or microphone and a small output transducer or speaker mounted in the handset in a manner well known to those familiar with the telephony art, will then be activated whereas the paging speaker 20 will be deactivated. Whenever the operator is desirous of utilizing the communication unit to initiate a paging function, both the communication switch 24 and pager switch 26 are actuated. The unit will then be conditioned for transmission of audio signals originating from the input microphone associated with the handset 18.

Figure 2:
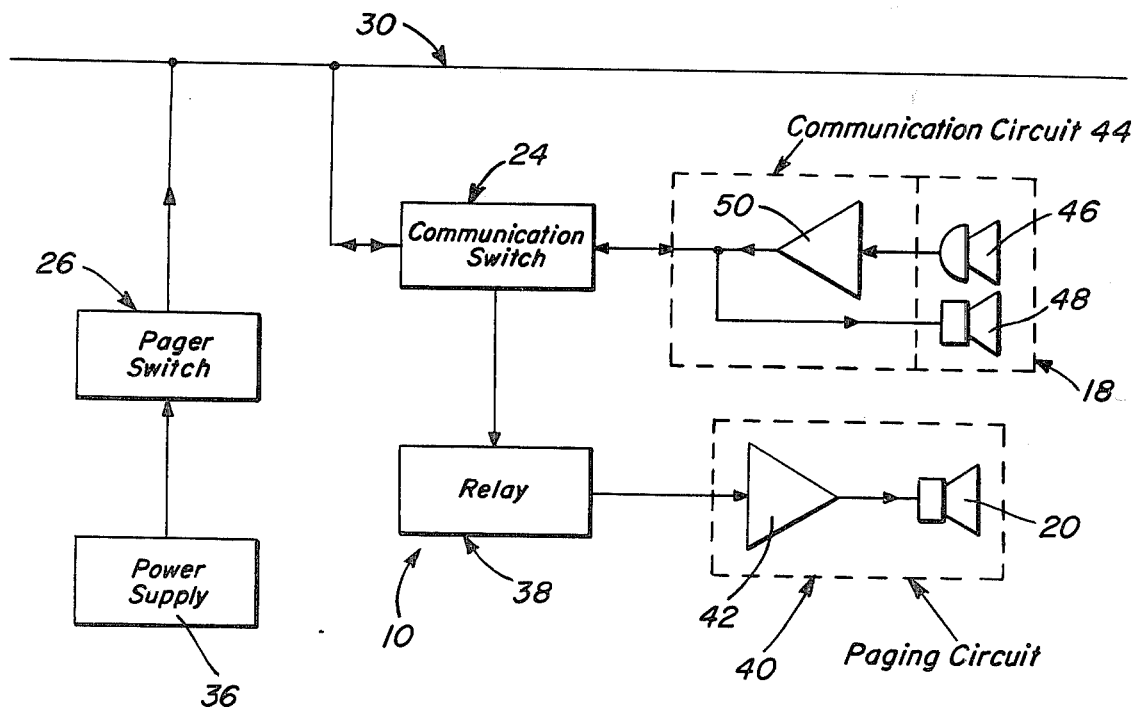
FIG. 2 is a simplified schematic block diagram illustrating the system of the present invention.

Referring now to FIG. 2, it will be noted that the intercommunication system includes the signal cable 30 to which each of the communication units 10 are connected, each communication unit including its own power supply 36 to maintain a low operating voltage across lines 32 and 34. Thus, with the pager switch in the standby position shown, any audio signals accompanied by a DC driving voltage component conducted through the signal cable will be sensed by the relay 38 which is operative to connect the signal cable to the paging circuit generally referred to by reference numeral 40 which includes the output speaker 20 aforementioned. Audio signals transmitted by the relay assembly 38 from the signal cable when the DC voltage component is sensed, will accordingly be amplified by the amplifier unit 42 in the paging circuit so as to reproduce a paging message through the output speaker 20. The relay assembly 38 is disabled by the operator when actuating the communication switch 24 which simultaneously connects the signal cable to the communication generally referred to by reference numeral 44. Thus, the communicate switch 34 alternately connects the communication and paging circuits to the signal cable. The communication circuit includes the input microphone 46 and speaker 48 mounted by the handset 18 in the embodiment illustrated in FIG. 1. The input from the microphone 46 is amplified by an amplifier unit 50 in the communication circuit, the output of the amplifier unit 50 being connected to the signal cable through the communication switch 24. The signal cable is also interconnected through the communication switch 24, when actuated, to the speaker 48 so that two way conversation may be conducted between any two stations at which similar communication units 10 are located. In order to utilize a communication unit for paging purposes, both the communication switch 24 and pager switch 26 are actuated as aforementioned. The communication switch 24 will then condition the communication circuit 44 for operation and disable the paging circuit through the relay assembly 38. The pager switch 26, on the other hand, will increase the input signal impedance of the power supply to incoming audio signals so that only audio signals originating from the communication circuit 44 may be transmitted to the signal cable for transmission to all of the other communication units which are in a standby or quiescent condition.

Figure 3:
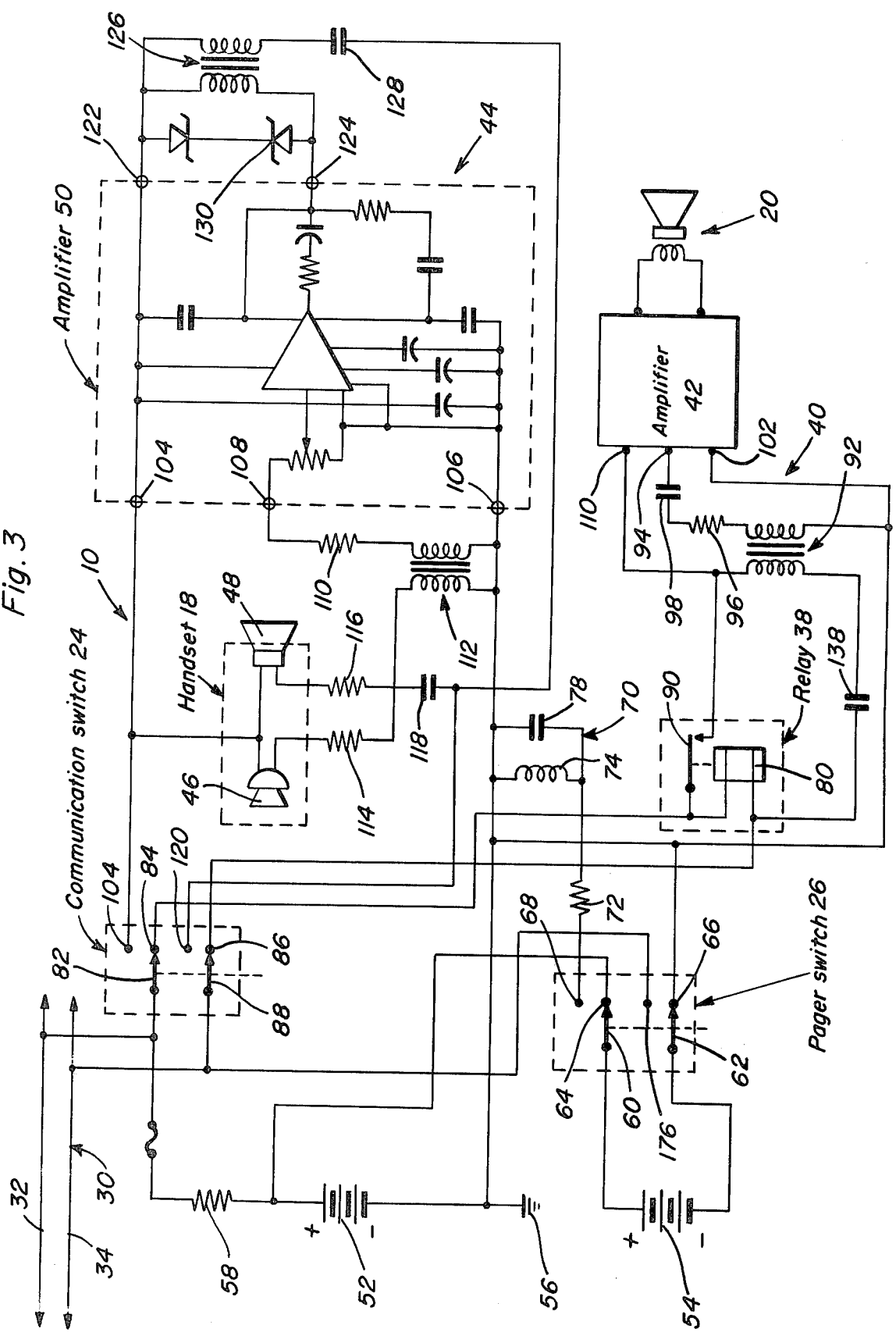
FIG. 3 is an electrical circuit diagram corresponding to one of the portable communication units associated with the present invention.

Referring now to FIG. 3 in particular, the communication unit 10 is shown in its quiescent or standby condition. The power supply includes a pair of batteries 52 and 54. Battery 52 has its negative terminal connected to chassis ground 56 while its positive terminal is continuously connected through a current limiting resistor 58 to the signal conductor 32 in series with the fuse 22. Thus, the battery 52 is normally operative to maintain a 24 VDC voltage on the signal conductor 32 above ground. Each of the communication units will thus contribute to the operating voltage maintained on the signal line 32 for operating the communication and paging circuits 44 and 40 associated with each of the communication units. In the standby condition of the communication unit, the other battery 54 is connected by the pager switch 26 in parallel with the battery 52. Toward that end, the pager switch 26 includes a pair of ganged switch elements 60 and 62 respectively connected to the positive and negative terminals of the battery 54 and normally engaging contacts 64 and 66 respectively connected to the positive terminal of battery 52 and to ground 56. The pager switch 26 also includes a normally disengaged contact 68 adapted to be engaged by the switch element 60 when the pager switch is actuated in order to connect the positive terminal of battery 54 to an impedance network 70 in which includes resistor 72 connected in series with inductance 74 to ground. Switch contact 76 in the pager switch 26, on the other hand, is engaged by switch element 62 when the pager switch is actuated in order to connect the negative terminal of battery 54 to the signal conductor 34. Thus, when the pager switch 26 is actuated, the battery 54 is disconnected from its parallel relationship to battery 52 and is reconnected between ground and signal conductor 34 in series with the resistor 72 and the inductance 74 through which the input signal impedance of the batteries is increased to prevent interference with the paging function. With the batteries connected in series, a DC driving voltage is applied across the signal lines which is combined with an audio signal voltage originating from the microphone 46 for paging purposes. The current limiting resistor 58 connected in series with the battery 52 and the resistor 72 connected in series with the battery 54 upon actuation of the pager switch 26, are operative as safety measures to prevent ignition of gases by arcing during switch actuation. This is particularly important in connection with the installation of intercommunication systems in underground mines. Also connected in parallel with the inductive impedance 74 is a filter capacitor 78 which is operative to eliminate transients generated by the inductive impedance 74 during switching operations.

The relay assembly 38 includes a signal sensing relay coil 80 which is connected across the signal conductors 32 and 34 in the standby condition of the communication unit through the communication switch 24. Toward that end, the communication switch 24 includes a switch element 82 which is connected to the signal conductor 32 and normally engages a switch contact 84 connected to one terminal of the relay coil 80, the other terminal of which is connected to the switch contact 86 normally engaged by the other switch element 88 ganged with the switch element 82 in the communication switch 24. The switch element 88 is connected to the other signal conductor 34. Thus, the DC voltage component accompanying any audio signal conducted through the signal conductors 32 and 34, will energize the relay coil 80 to thereby close its normally opened relay switch 90. Upon closing of the relay switch 90, the paging circuit 40 is connected across the signal conductors 32 and 34 through the switch elements 82 and 88 in the communication switch.

Any audio signal voltage component across the signal conductors 32 and 34 will be applied across the primary winding of the signal coupling transformer 92 associated with the paging circuit 40. The output winding of the signal coupling transformer 92 is connected to the input terminal 94 of amplifier 42 in series with the resistor 96 and capacitor 98. Energizing voltage from signal line 32 is supplied to the power terminal 100 through the relay switch 90 while the other terminal 102 of the amplifier 42 is connected to ground. Thus, the amplifier 42 will drive the paging output speaker 20 upon sensing of DC driving current by the relay assembly 38 while the communication unit 10 is in the standby condition.

The communication unit is conditioned for transmitting and receiving audio signals in a communication mode for two way conversation by actuation of the communication switch 24. When actuated, the switch element 82 of the communication switch will connect the signal conductor 32 to the switch contact 104 through which operating voltage from the batteries is supplied to the signal voltage terminal 104 of the amplifier unit 50 which like the amplifier unit 42 has a ground terminal 106. The input terminal 108 of the amplifier unit 50 is connected by coupling resistor 110 to the output winding of a signal coupling transformer 112 having a primary winding coupled by resistor 114 to the input microphone 46 mounted by the handset 18. Operating voltage is supplied to the microphone 46 from the operating voltage supply contact 104 of the communication switch which is also connected to one terminal of the speaker 48 in the handset, the other terminal of which is connected by resistor 116 and capacitor 118 to the switch contact 120 engaged by the switch element 88 upon actuation of the communication switch 24. The switch element 88 connects the contact 120 to the other signal conductor 34 thereby connecting the communication circuit 44 across the signal lines. The output terminals 122 and 124 of the amplifier unit 50 are connected to the output transformer 126 through which amplified audio signals originating from the microphone 46 are fed to the signal cable. A coupling capacitor 128 is connected in series with the output winding of transformer 26 across the signal lines 32 and 34 through the switch contacts 104 and 120 of the communication switch. Series connected zener diodes 130 are connected in parallel with the primary winding of the transformer 126 in order to limit the output voltage of the communication circuit when connected across the signal conductors upon actuation of the communication switch. When actuated, the communication switch will also simultaneously disconnect the signal lines 32 and 34 from the relay assembly 38 thereby disabling the paging circuit 40.

When the communication switch 24 is actuated to enable the communication circuit 44 and disable the paging circuit 40, the pager switch 26 must also be actuated in order to condition the communication unit for output paging purposes. The actuated pager switch will therefore increase the impedance of the batteries to any input audio voltages across the signal conductors 32 and 34 as aforementioned thereby rendering the communication unit operative only for its paging function.

The amplifier units 42 and 50 are interchangeable thereby facilitating maintenance and replacement of components. The amplifier units are of a commercially available, solid state type interconnected between the three terminals on the input side and the two terminals on the output side. While the amplifier unit 50 amplifies an input audio signal derived from the microphone 46 and transmitted thereto through the transformer 112, the amplifier 42 amplifies an input signal supplied from the signal lines through signal coupling capacitor 130 which is fed to the input terminals at the amplifier through the input transformer 92. The output of the amplifier 50 is coupled by the transformer 126 to the signal conductors whereas the output of the amplifier 42 is fed to the paging speaker 20. Audio signals on the other hand are directly fed to the speaker 48 of the handset 18, when the communication circuit 44 is in operation, through the switch contacts 104 and 120 of the communication switch in series with the resistor 116 and capacitor 118.

The various operational modes for each unit 10 as hereinbefore described with reference to FIG. 3, are summarized in the following chart:

| MODE | SWITCH POSITION | | | | D.C. LINE | |
| | PAGER 26 | | COMM 2A | | VOLTAGE | |
| | UP | DOWN | UP | DOWN | LOW | HIGH |
|---|---|---|---|---|---|---|
| STANDBY | | X | | X | X | |
| (page-receive) COMMUNICATION | | X | | X | X | |
| (Transmit-receive) PAGE-TRANSMIT | X | | X | | | X |

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an intercom system having a common signal cable to which a plurality of communication units are connected, each of said units including a source of electrical energy connected to said cable for normally maintaining a relatively low d.c. operating potential thereon, a paging circuit having an output speaker, through which incoming audio signals are reproduced, sensing means responsive to a relatively high d.c. driving voltage applied to the signal cable with said incoming audio signals for connecting the paging circuit thereto to reproduce the incoming audio signals, a communication circuit having input and output transducers through which incoming and outgoing audio signals are respectively reproduced and generated, communicate switch means for connecting the signal cable to the communication circuit and simultaneously disabling the sensing means, and pager switch means interconnected between the signal cable and said source of electrical energy for selectively applying said d.c. driving voltage to the signal cable while the outgoing audio signals are being generated in the communication circuit.

2. The combination of claim 1 wherein each of said communication and pager circuits includes an operating voltage line selectively connected to the signal cable by one of said sensing means and communicate switch means, an amplifier energized by energy supplied thereto through the operating voltage line, and signal coupling means operatively connecting the signal cable to the amplifier through the communicate switch means, said amplifiers having outputs respectively connected to the output speaker and the output transducer.

3. The combination of claim 1 wherein the amplifiers of the communication and paging circuits are interchangeable.

4. The combination of claim 3 wherein the source of electrical energy includes a pair of batteries normally connected in parallel to the signal cable, an inpedance network, means responsive to actuation of the pager switch means reconnecting the batteries in series with each other and said impedance network for increasing impedance to the incoming audio signals in the signal cable, and means responsive to energization of the sensing means for energizing the paging circuit.

5. The combination of claim 4 wherein said signal cable includes a pair of signal conductors, said circuits being alternately connected across the conductors by the communicate switch means for operation of the unit in a page-receive mode and a page-transmit mode respectively.

6. The combination of claim 1 wherein said source of energy further includes a current limiting resistor connected in series with one of the batteries between one of the signal conductors and chassis ground, the other of the batteries being alternately connected in parallel with said one of the batteries by the pager switch means and in series with the impedance network between chassis ground and the other of the signal conductors.

7. The combination of claim 1 wherein the source of electrical energy includes a pair of batteries normally connected in parallel to the signal cable, an impedance network, and means responsive to actuation of the pager switch means reconnecting the batteries in series with each other and said impedance network for increasing impedance to the incoming audio signals in the signal cable.

8. The combination of claim 7 wherein said signal cable includes a pair of signal conductors, said circuits being alternately connected across the conductors by the communicate switch means for operation of the unit in a page-receive mode and a page-transmit mode respectively.

9. The combination of claim 1 wherein said source of energy further includes a current limiting resistor connected in series with one of the batteries between one of the signal conductors and chassis ground, the other of the batteries being alternately connected in parallel with said one of the batteries by the pager switch means and in series with the impedance network between chassis ground and the other of the signal conductors.

10. The combination of claim 1 wherein said signal cable includes a pair of signal conductors, said circuits being alternately connected across the conductors by the communicate switch means for operation of the unit in a page-receive mode and a page-transmit mode respectively.

11. In an intercom system having a pair of signal lines, a communication unit including a pair of batteries connected in parallel between one of the signal lines and ground to apply a relative low d.c. operating voltage to the signal lines, a pair of amplifiers, signal voltage sensing means connected across said signal lines for connecting one of the amplifiers to the parallel connected batteries in response to a higher driving voltage applied to said signal lines, selectively actuated switch means for simultaneously disabling the voltage sensing means and connecting the other of the amplifiers across the signal lines, and pager switch means connected to said batteries for reconnecting one of the batteries between ground and the other of the signal lines to apply said driving voltage to the signal lines.

12. The combination of claim 1 including an impedance network connected in series with said one of the batteries between chassis ground and the other of the signal lines by the pager switch means when actuated.

13. The combination of claim 1 including an input microphone coupled to one of the amplifiers, an output speaker coupled to the other of the amplifiers, output means connecting said one of the amplifiers to the selectively actuated switch means and input means connecting the other of the amplifiers to the signal voltage sensing means.

14. The combination of claim 13 wherein said amplifiers are interchangeable.

15. The combination of claim 1 including an input microphone coupled to one of the amplifiers, an output speaker coupled to the other of the amplifiers, output means connecting said one of the amplifiers to the selectively actuated switch means and input means connecting the other of the amplifiers to the signal voltage sensing means, said amplifiers being interchangeable.

* * * * *